(12) United States Patent
Sanders

(10) Patent No.: US 11,180,220 B2
(45) Date of Patent: Nov. 23, 2021

(54) OUTRIGGER FOR A BOAT

(71) Applicant: Brian Sanders, Pakenham (AU)

(72) Inventor: Brian Sanders, Pakenham (AU)

(*) Notice: Subject to any disclaimer, the term of this patent is extended or adjusted under 35 U.S.C. 154(b) by 0 days.

(21) Appl. No.: 16/995,800

(22) Filed: Aug. 17, 2020

(65) Prior Publication Data

US 2021/0061418 A1 Mar. 4, 2021

(51) Int. Cl.
*B63B 17/00* (2006.01)
*A01K 97/10* (2006.01)

(52) U.S. Cl.
CPC .............. *B63B 17/00* (2013.01); *A01K 97/10* (2013.01); *B63B 2017/0054* (2013.01)

(58) Field of Classification Search
CPC ............ B63B 17/00; B63B 2017/0054; B63B 2017/0063; B63B 34/05; A01K 91/053; A01K 91/08; A01K 97/10
See application file for complete search history.

(56) References Cited

U.S. PATENT DOCUMENTS

| | | | | |
|---|---|---|---|---|
| 3,161,390 A | * | 12/1964 | Larson | A01K 91/08 248/514 |
| 3,190,594 A | * | 6/1965 | Chion | A01K 91/08 248/514 |
| 3,246,865 A | * | 4/1966 | Latimer | A01K 97/10 248/515 |
| 4,993,346 A | * | 2/1991 | Rupp | A01K 91/08 114/255 |
| 5,778,592 A | * | 7/1998 | Malmberg | A01K 97/10 43/21.2 |
| 6,769,377 B2 | * | 8/2004 | Rupp, II | B63B 35/14 114/255 |
| 8,944,399 B2 | * | 2/2015 | Sutherland | A01K 97/10 248/519 |
| 9,360,035 B2 | * | 6/2016 | Carnevali | F16B 7/0413 |
| 2005/0102881 A1 | * | 5/2005 | Legendziewicz | A01K 97/10 43/21.2 |

* cited by examiner

*Primary Examiner* — Ajay Vasudeva
(74) *Attorney, Agent, or Firm* — Pete Adams Law, PLLC

(57) ABSTRACT

An outrigger for holding an object on a boat is described. The outrigger includes a mounting cylinder for attaching the outrigger to a boat, a hub having a first gear set, where the hub is adapted to be placed in one end of the mounting cylinder. The outrigger further includes an arm for holding an object. The arm is adapted to be inserted into the other end of the mounting cylinder and has a second gear set for locking with the first gear set in the hub. The arm can be rotated with respect to the mounting cylinder by pulling the arm outward from the mounting cylinder, rotating the arm with respect to the mounting cylinder, and reengaging it with the first gear set in the hub.

2 Claims, 6 Drawing Sheets

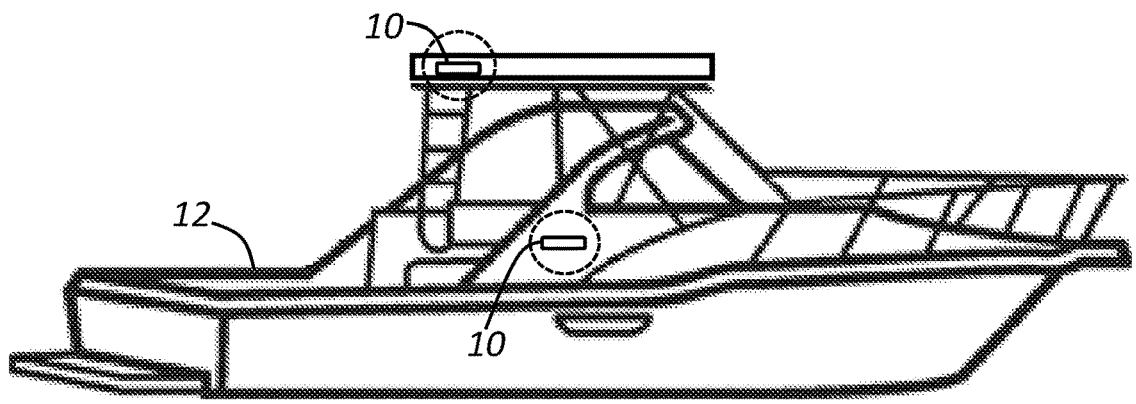
Figure 1 – Prior Art
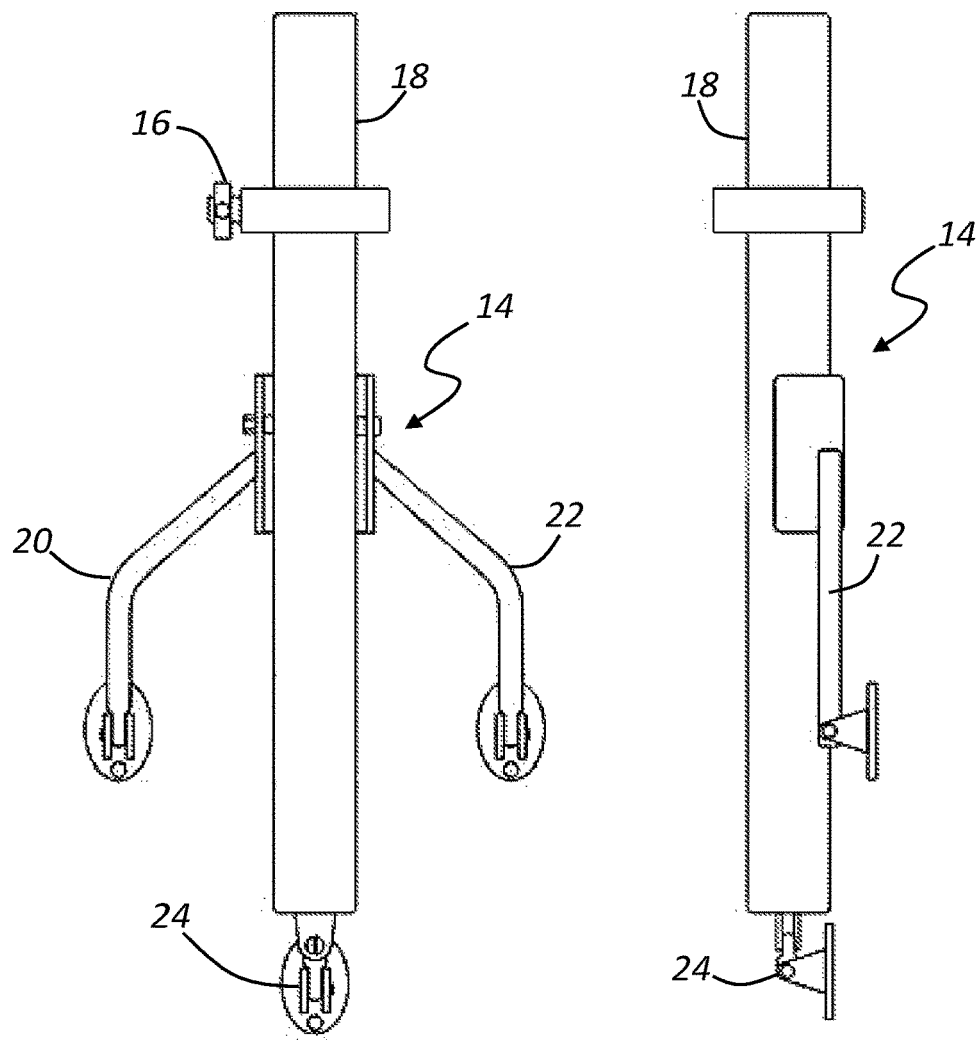 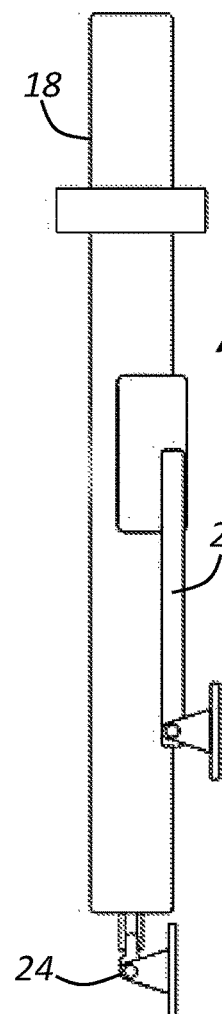
Figure 2 – Prior art          Figure 3 – Prior art

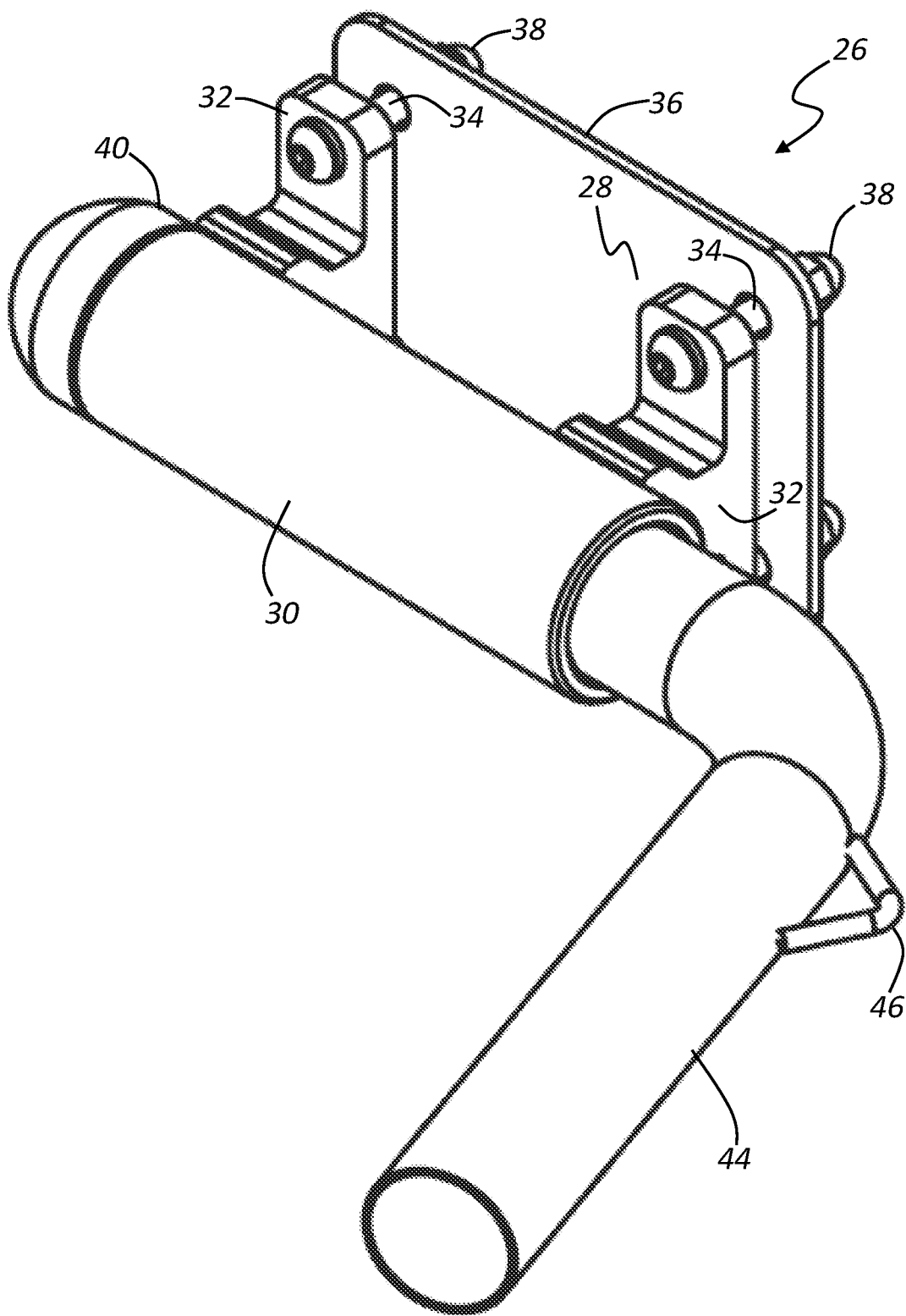
*Figure 4 – Present Invention*

OUTRIGGER FOR A BOAT

BACKGROUND OF THE INVENTION

1. Field of the Invention

The present invention relates to devices sold in the boating industry and, more particularly to an outrigger for holding objects on a boat.

2. Description of Related Art

FIG. 1 shows a basic prior art outrigger 10 on the side of a boat 12. An outrigger is essentially a metal tube which is used to hold objects on boats such as fishing rods, fishing nets, fishing gaffs, outrigger poles, wake board stands, flags and life-saving devices.

Conventional outriggers are fixed into a single position on the boat. However, it is desirable to be able to adjust the angle of the outrigger with respect to the boat. For example, in rough seas, a person may want to have the outrigger pointing a fishing line upwards. In calm seas, the person may want to have the outrigger pointing the fishing line at angle so that the line is cast further from the boat.

In order to adjust the angle of the outrigger, a more advanced prior art outrigger 14 was developed (shown in FIG. 2). The outrigger 14 has a swing mechanism. The swing mechanism comprises a releasable pin 16 which holds the top of a tube 18 against the side of the boat and, when released, allows arms 20 and 22 of the outrigger 14 to lean outwardly from the side of the boat from a hinge 24 at the bottom of the outrigger.

However, a problem with the more advanced prior art outrigger 14 is that it only has two fixed positions: (1) upward and (2) outward. The pin 16 (which holds the outrigger in the upward position) is easily lost. Once the pin 16 is lost, the outrigger 14 cannot be locked into the upward position. The arms 20 and 22 and the hinge 24 are potential failure points. The nuts on each hinge point rust with sea water and seize into various positions.

The object of the invention is to provide an outrigger which can be adjusted at any desired angle and which has minimal failure points in order to increase its reliability.

SUMMARY OF THE INVENTION

According to the present invention, there is an outrigger for holding an object on a boat, the outrigger comprising:
 (a) a cylinder adapted to mount the outrigger to a boat;
 (b) a hub with a first gear set adapted to be inserted in one end of the cylinder; and
 (c) an arm with a second gear set adapted to be inserted into the other end of the cylinder,
  wherein the arm is adapted hold an object and can be rotated with respect to the cylinder by pulling the arm outward from the cylinder to disengage the gear sets, rotating the arm with respect to the mounting cylinder and reengaging gear sets in the hub.

Preferably, the outrigger includes a piston having a bolt which is fastened through the mounting cylinder into the arm with a spring surrounding the bolt, so that the spring is compressed when the arm is pulled out of the mounting cylinder in order to reengage the second gear set back into the first gear set once the user has set the desired angle of the arm with respect to the mounting cylinder.

The arm may have a locating pin within it so that it can interface with a base of a fishing rod to stop the fishing rod from rotating within the arm.

It is preferred that the outrigger includes mounting cylinder feet which are attached to the mounting cylinder. The outrigger may have screws adapted to pass through the mounting cylinder feet into the inner side of a boat to attach the mounting cylinder to the boat. It is preferred that the outrigger has a backing plate to be placed between nuts on the bolts on the inner side of the boat.

The outrigger preferably has a hook point for attaching a lanyard on the object that is inserted into the arm.

Any of the features described herein can be combined in any combination with any one or more of the other features described herein within the scope of the invention.

BRIEF DESCRIPTION OF DRAWINGS

Various embodiments of the invention will be described with reference to the following drawings, in which:

FIG. 1 is a side view of a typical boat which has basic prior art outriggers attached to it.

FIG. 2 is a front view of a more advanced prior art outrigger.

FIG. 3 is a side view of the prior art outrigger of FIG. 2.

FIG. 4 is a perspective view of an outrigger according to an embodiment of the present invention.

DETAILED DESCRIPTION OF INVENTION

Figure 5:
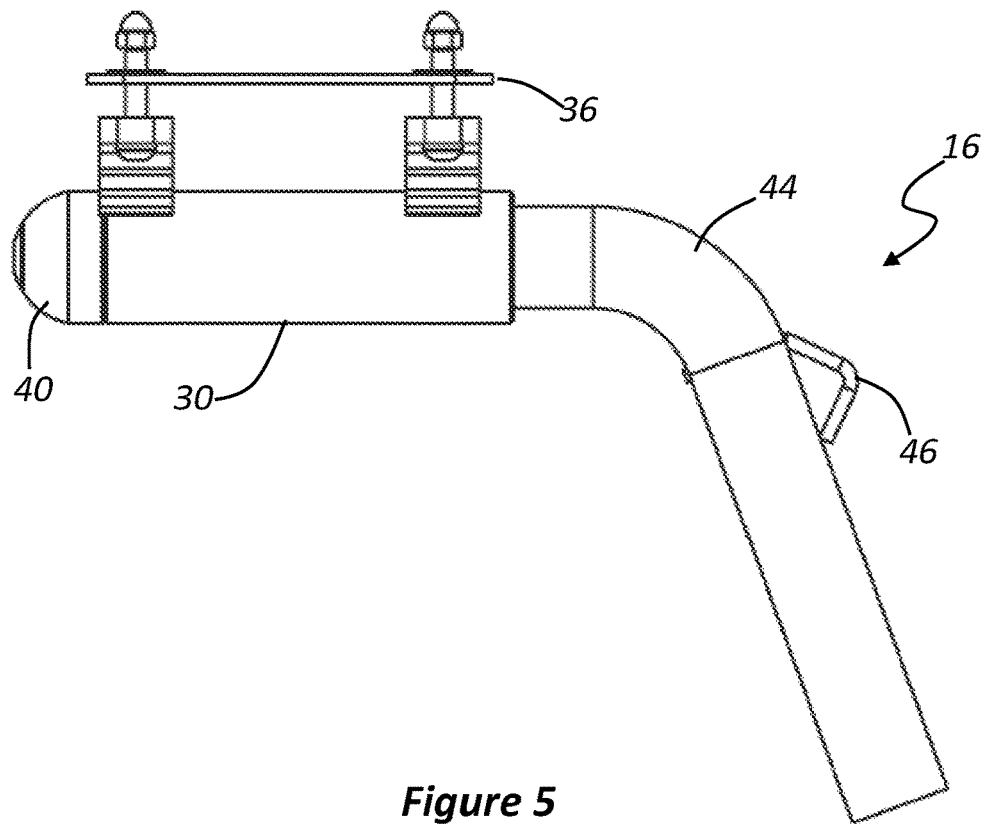
FIG. 5 is a top view of the outrigger of FIG. 4.
Figure 6:
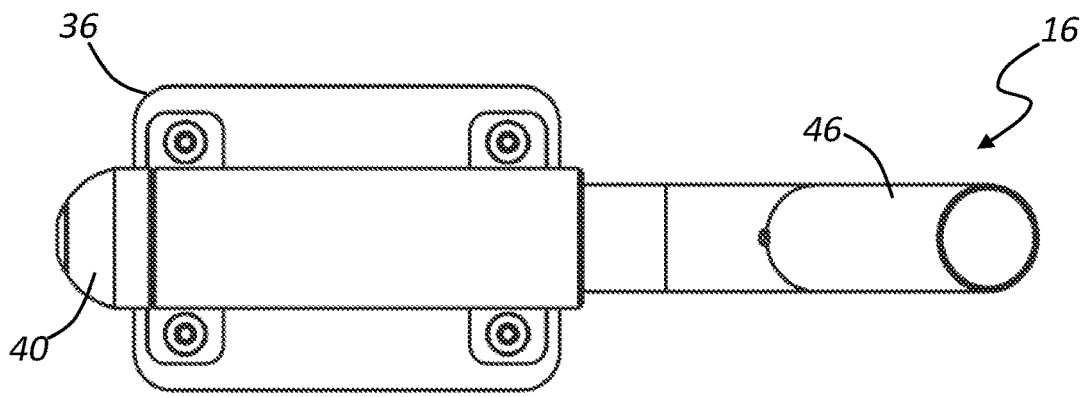
FIG. 6 is a side view of the outrigger of FIG. 4.
Figure 7:
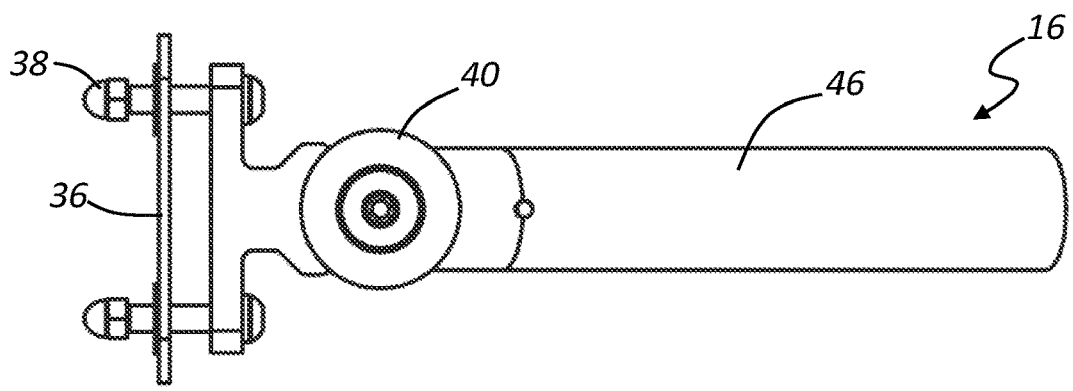
FIG. 7 is a rear view of the outrigger of FIG. 4.
Figure 8:
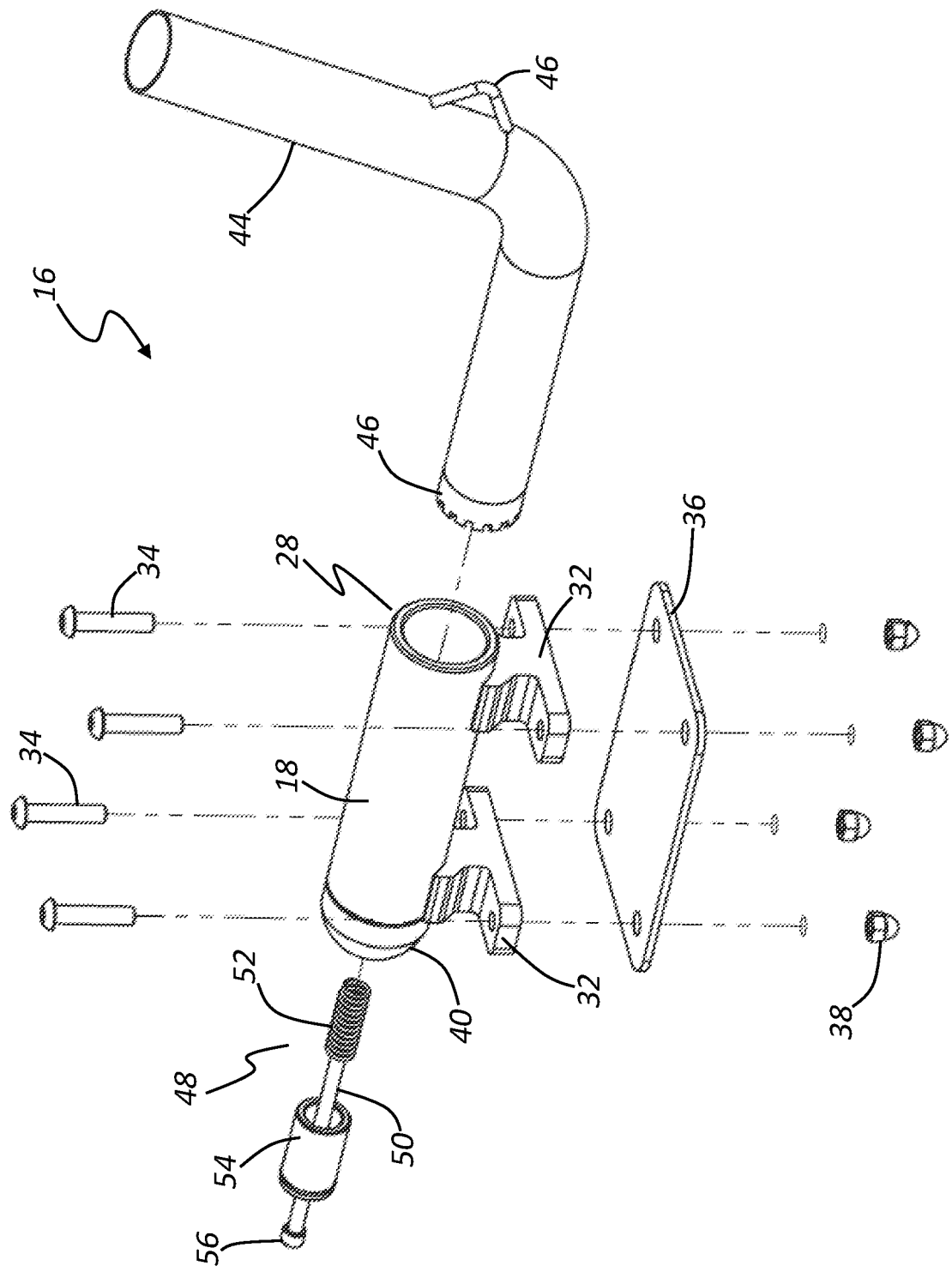
FIG. 8 is an exploded view of the outrigger of FIG. 4.
Figures 9, 10:
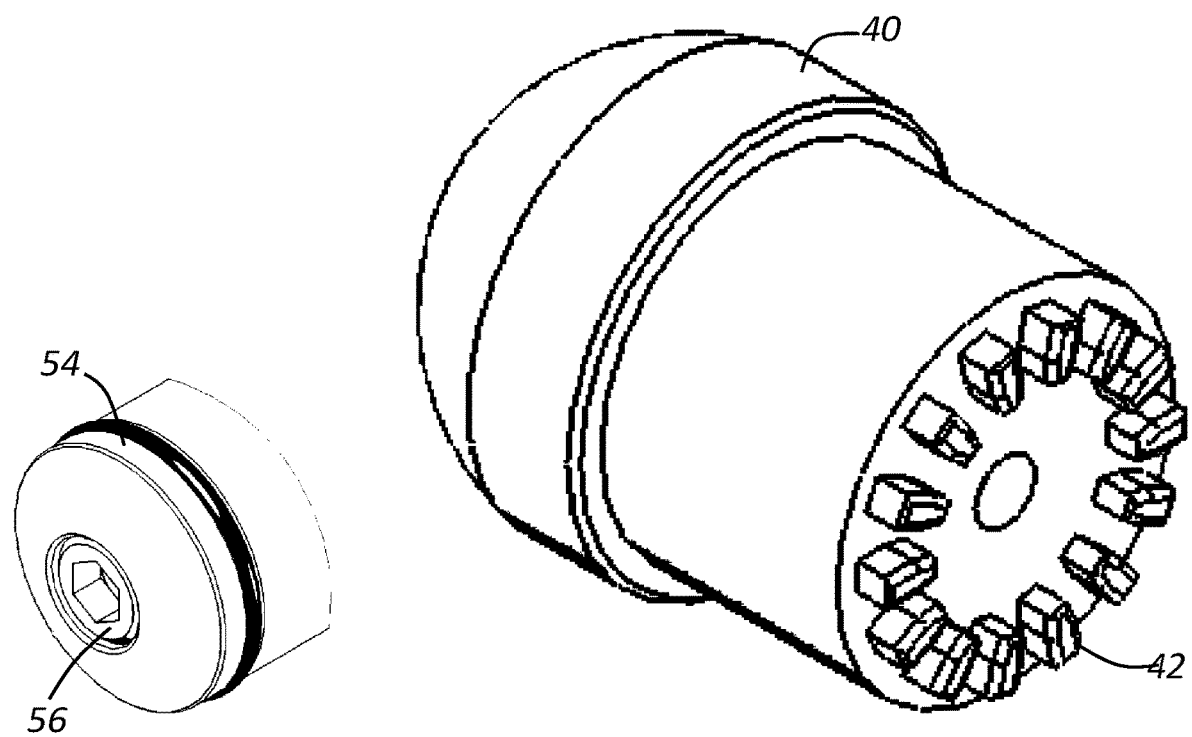
FIG. 9 is a perspective view of the cap of the hub of the outrigger of FIG. 4.
FIG. 10 is a perspective view of the male gears on the hub of the outrigger of FIG. 4.

FIGS. 4 to 12 show an outrigger 26 according to an embodiment of present invention. The outrigger 26 has a mounting assembly 28 which includes:
 (a) a cylinder 30,
 (b) feet 32 attached to the cylinder 30 and adapted to abut a surface of a boat,
 (c) bolts 34 adapted to pass through feet 32 and into the surface of the boat,
 (d) a plate 36 adapted to receive the bolts and on the opposite side of the surface of the boat; and
 (e) nuts 38 screwed onto the bolts 34 to hold the mounting assembly 28 on the surface of the boat.

A hub 40 is placed on one end of the cylinder 30. The cylinder 30 has a male gear set 42 (see FIG. 10).

The outrigger 26 also has a hollow arm 44 for holding an object such as fishing rods, fishing nets, fishing gaffs, outrigger poles, wake board stands, flags and life-saving devices.

Figure 11:
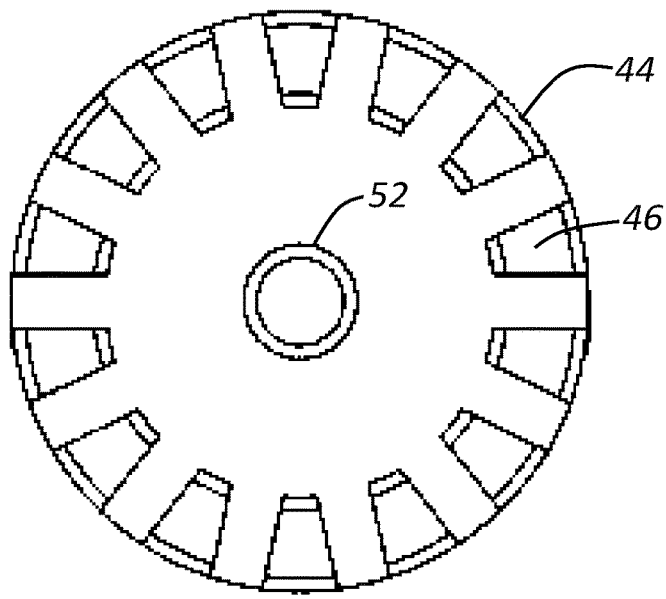
FIG. 11 is a front view of the female gear on the arm of the outrigger of FIG. 4.
Figure 12:
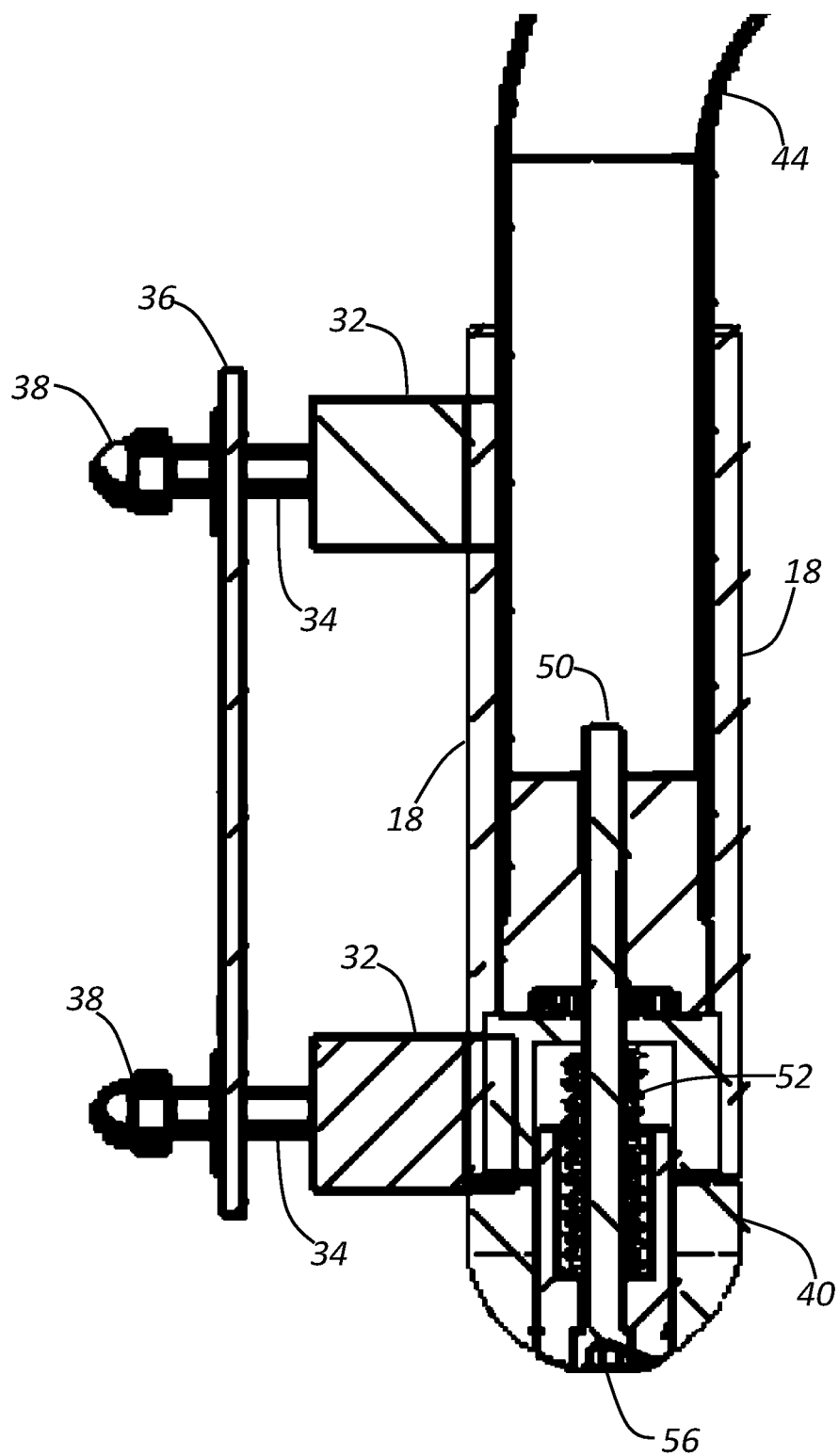
FIG. 12 is a side-section view of the outrigger of FIG. 4.

The arm 44 has a female gear set 46 (see FIG. 11). The female gear set 46 interlocks with the male gear set 42. When the female gear set 46 is not engaged with the male gear set 42, the arm 44 can be rotated. The male and female gear sets 46 and 42 can be engaged and disengaged using a retainer assembly 48.

The retainer assembly 48 comprises:
 (a) a threaded pin 50 adapted to pass through the hub 40, (b) an internal thread 52 within the arm 44 for receiving the threaded pin 50,
(c) a spring 52 which is placed over the threaded pin 50,
(d) a cap 54 which placed over spring 52 within the hub 40, and
(e) a bolt 56 which is fastened on top of the threaded pin 50 and thereby holds the cap 54 on the spring 52,
wherein the arm 44 can be pulled from the mounting assembly 28 a distance equal to the distance by which the spring 52 can be compressed, so that the first and second gear sets (46 and 42) on the arm 44 and hub 40 can be disengaged to allow the arm 44 to be rotated.s In order to prevent objects in the outrigger 26 from going overboard, the arm 44 has a hoop 46 so that a lanyard (not shown) can be attached to the objects. The lanyard can hold the object on the boat in the event that the object is inadvertently withdrawn from the arm, such as a fishing rod being pulled out of the outrigger by a fish on the hook.

The retainer assembly allows the outrigger of the present invention to be adjusted to any desired angle, unlike prior art outriggers. The outrigger of the present invention has minimal failure points, which increases its reliability in comparison to prior art outriggers. The spring of the present invention is sealed within the body of the outrigger so it cannot rust and degrade.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An outrigger for holding an object on a boat, the outrigger comprising:
   (a) a mounting cylinder for attaching the outrigger to a boat;
   (b) a hub having a first gear set, wherein the hub is adapted to be placed into a first end of the mounting cylinder;
   (c) an arm for holding an object, wherein the arm:
      (i) is adapted to be inserted into a second end of the mounting cylinder;
      (ii) has a second gear set for locking with the first gear set in the hub; and
      (iii) can be rotated with respect to the mounting cylinder by pulling the arm outward from the mounting cylinder, rotating the arm with respect to the mounting cylinder, and reengaging it with the first gear set in the hub; and
   (d) a retainer assembly for the arm, the retainer assembly comprising:
      (i) a threaded pin adapted to pass through the hub;
      (ii) an internal thread within the arm for receiving the threaded pin;
      (iii) a spring placed over the threaded pin;
      (iv) a cap placed over spring within the hub; and
      (v) a bolt fastened on top of the threaded pin, thereby holding the cap on the spring;
         wherein the arm can be pulled from the mounting assembly a distance equal to a distance by which the spring can be compressed, so that the first and second gear sets can be disengaged to allow the arm to be rotated.

2. The outrigger of claim 1, wherein the outrigger has a hoop so that a lanyard can be attached to the object held by the arm.

* * * * *